Oct. 13, 1942.    R. W. GORTON    2,298,619
CAMPING EQUIPMENT
Filed Oct. 7, 1940    4 Sheets-Sheet 1

Ralph W. Gorton, Inventor

By Ogle R. Singleton
Attorney

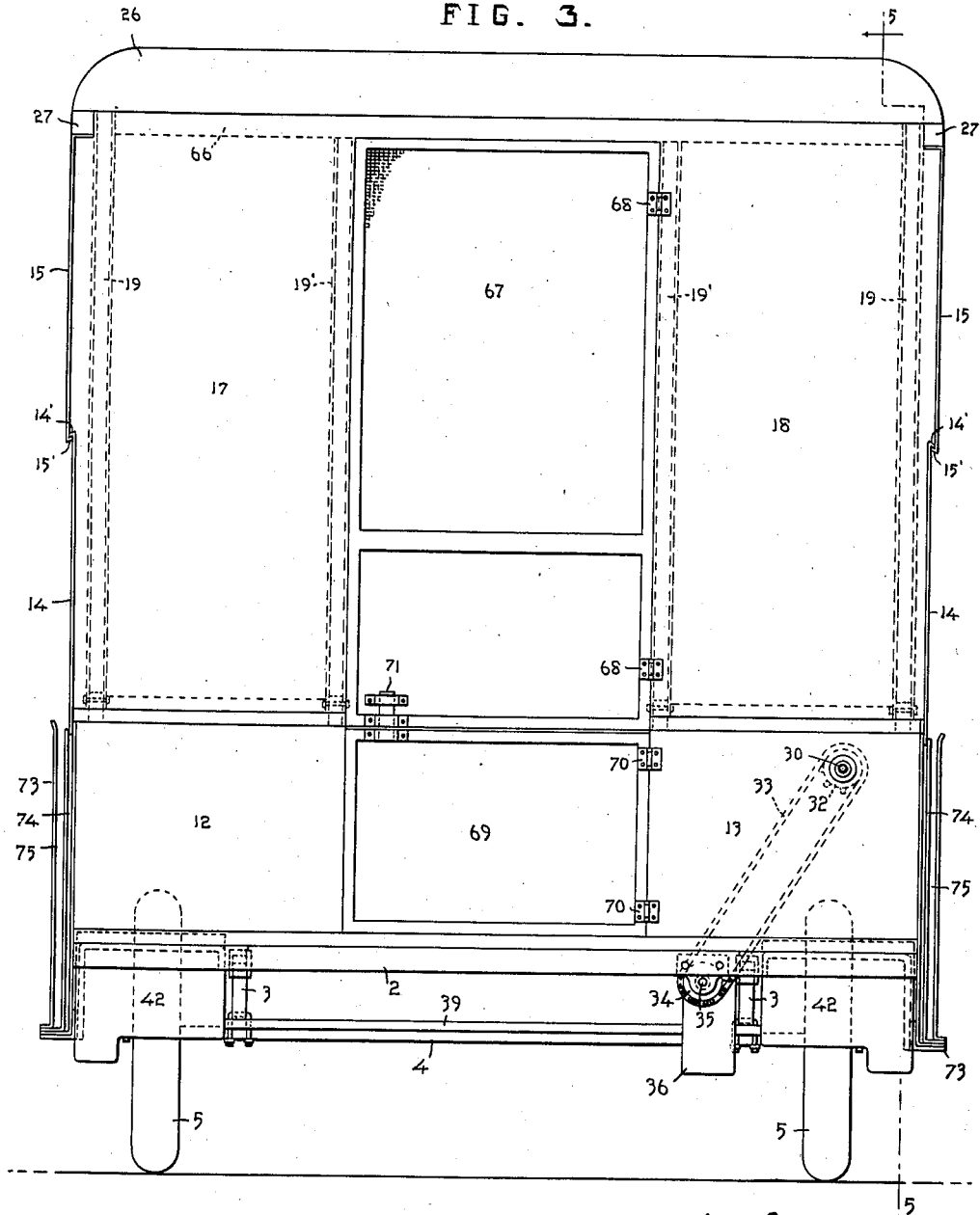

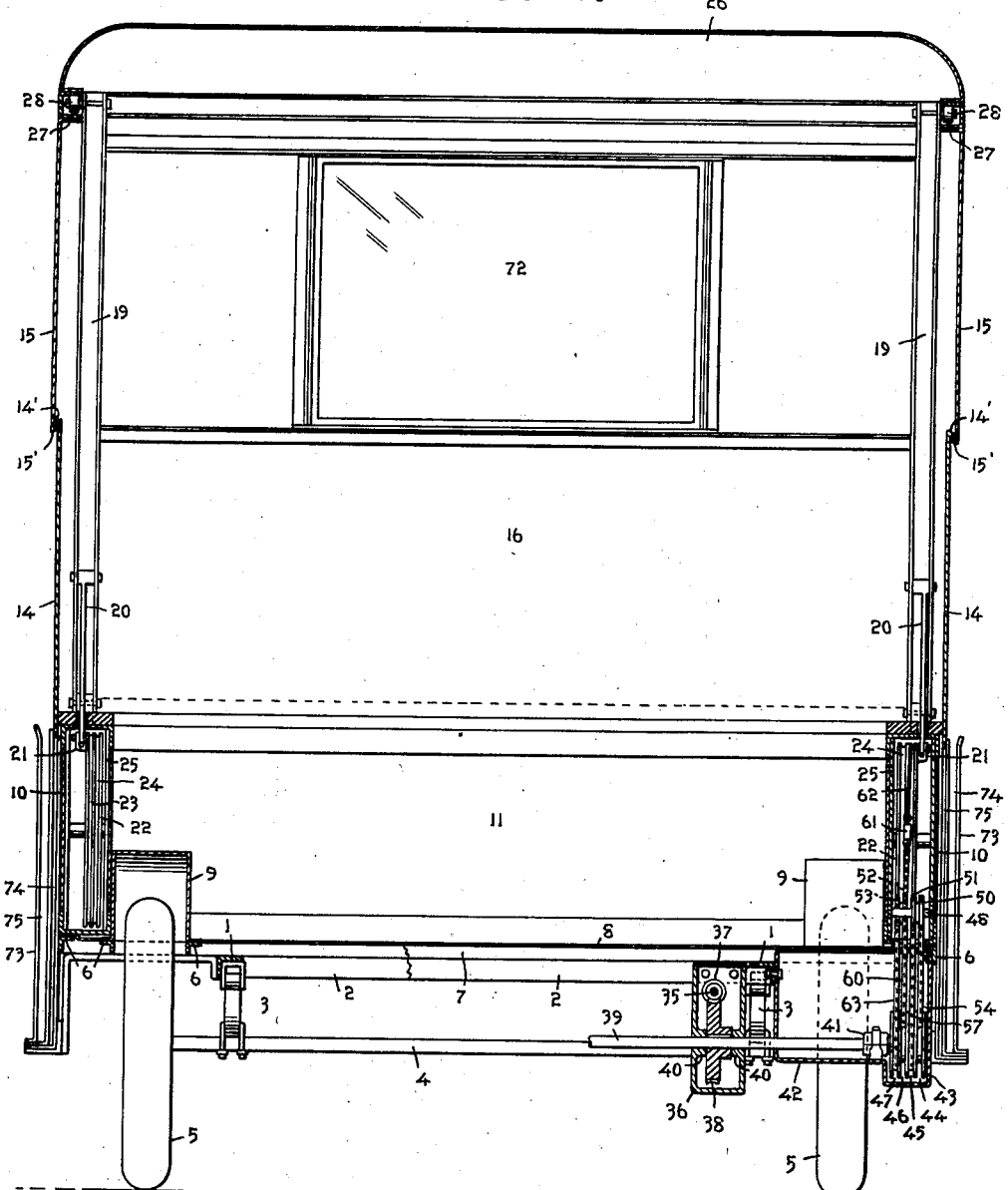

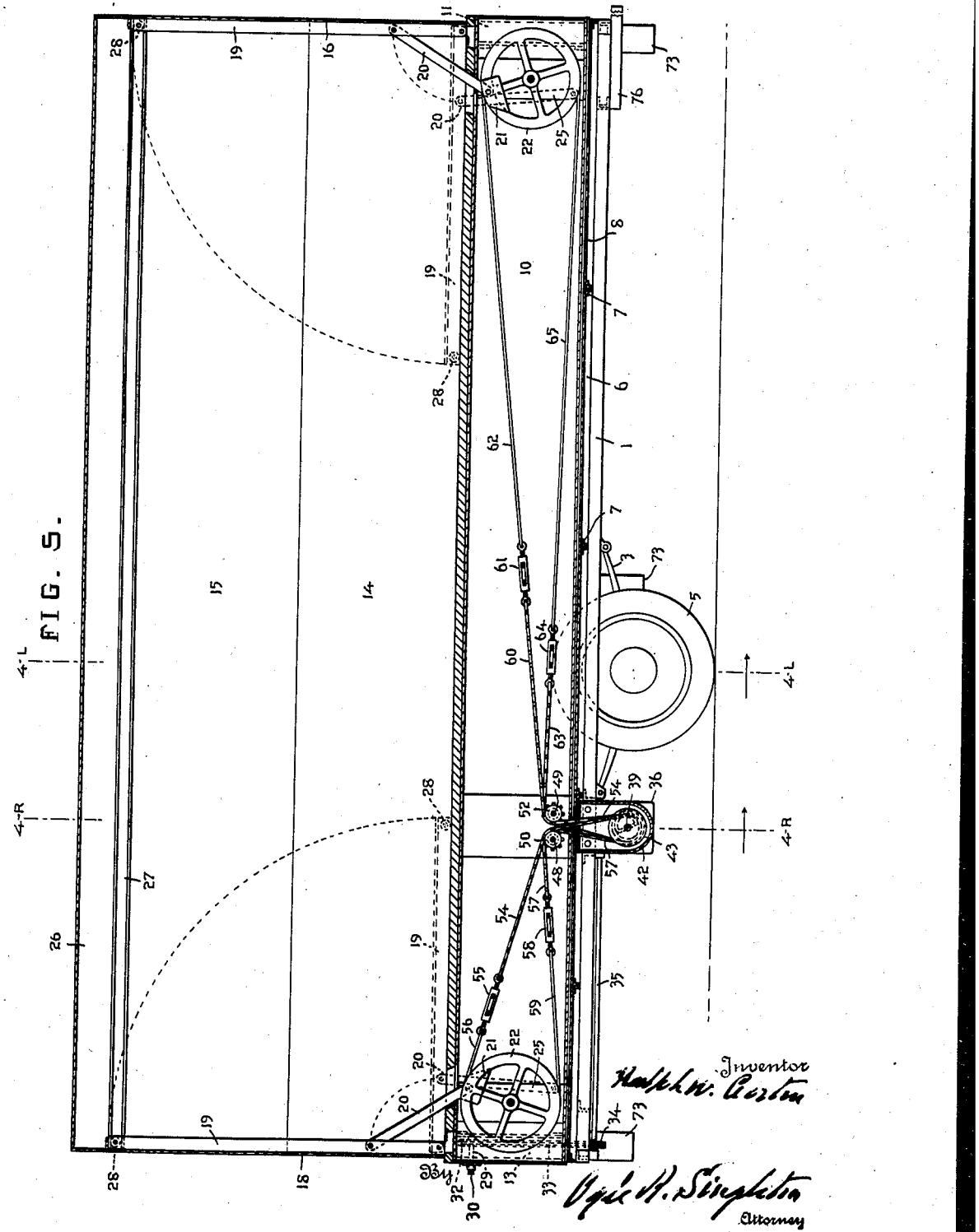

Patented Oct. 13, 1942

2,298,619

UNITED STATES PATENT OFFICE 2,298,619

CAMPING EQUIPMENT

Ralph W. Gorton, St. Albans, Vt.

Application October 7, 1940, Serial No. 360,177

9 Claims. (Cl. 20—2)

My invention consists in a new and useful improvement in camping equipment, and is designed to provide a camp house having solid floor, walls and roof, and which may be folded into a comparatively small compass, so that it can be transported on a trailer towed by an automobile. My device is provided with operating mechanism for collapsing and erecting the house, which is manually operated. The user can tow the device, folded, to the spot where he desires to camp, and then quickly and easily convert the folded device into a camp house. The mechanism causes the walls and roof to rise into their proper positions, and then locks the entire device in open position. The particularly novel and useful features of my device are the design and association of the base, walls and roof to form the complete camp house, and the operating mechanism whereby the walls and roof are caused to rise and subside, all being accomplished by manual operation. It will be seen that my improved device provides an entirely adequate house of extremely economical and sturdy construction, as the solution of the problem of automobile campers who desire a portable camp. My device supplies all the requisites found in the rigid, non-collapsible house mounted upon a trailer for towing behind automobiles, when it has been erected, but it has none of the disadvantages of unwieldy bulk while being transported, since it is folded into comparatively small compass during transportation. Likewise, while having all the advantages for transportation of a collapsible tent, it requires none of the laborious operations required for erecting the ordinary tent, since it may be quickly and easily erected by means of the novel form of operating mechanism which I have devised.

While I have illustrated in the drawings filed herewith and have hereinafter fully described one specific embodiment of my invention, it is to be distinctly understood that I do not consider my invention limited to said specific embodiment, but refer for its scope to the claims appended hereto.

In the drawings:

Fig. 3 is a rear elevation of my device, the parts being in the position shown in Fig. 1.

Fig. 4 is a transverse vertical section of my device, the portion to the right of the vertical diameter of the view being taken on the line 4R—4R of Fig. 5, and the portion to the left of the vertical diameter being taken on the line 4L—4L of Fig. 5.

Fig. 5 is a longitudinal vertical section of my device on the line 5—5 of Fig. 3.

Figure 1:
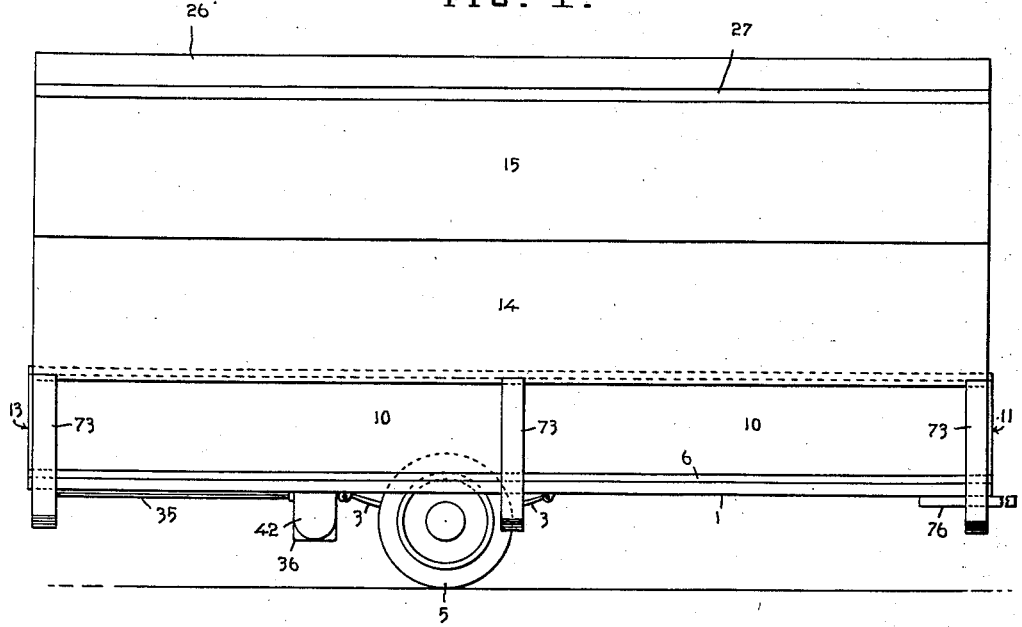
Fig. 1 is a side elevation of my device, the parts being shown extended for the use of the device.

As illustrated in the drawings, my device has a chassis, rectangular in form, of suitable length and width, formed by the side angle irons 1 and the cross angle irons 2, and suitably mounted by springs 3 on an axle 4 having wheels 5. Carried by this chassis is the main frame of the device comprising the side angle irons 6 and cross angle irons 7. Suitably mounted on this main frame is the floor 8 having the wheel wells 9 extended therethrough to accommodate the upper portions of the wheels 5. Suitably mounted about the floor 8 are the fixed side walls 10, the fixed front end wall 11 and the fixed rear end walls 12 and 13. Associated with the side walls 10 are the sectional vertically slidable side walls comprising the lower panels 14, and the upper panels 15. Associated with the front end wall 11 is the hinged end wall 16, and with the rear end walls 12 and 13 are the hinged end walls 17 and 18, respectively. The front end wall 16 is mounted on U-beam posts 19 hingedly mounted at the forward corners, at the junction of the fixed side wall 10 and the fixed front end wall 11. Each post 19 has pivoted thereon a pitman 20 pivoted to a boss 21 on the periphery of a pulley 22 with grooves 23 and 24, journaled in a housing 25 mounted on the side wall 10. The rear end walls 17 and 18 are similarly mounted on posts 19 hingedly mounted at the rear corners at the junction of the fixed side walls 10 and the fixed end walls 12 and 13, and are provided with the same form of actuating media as the posts above described.

Suitably attached to the upper panels 15 of the slidable side walls, there is the top 26 of suitable length and width. At the juncture of the top 26 and each panel 15, there is a raceway 27. Each of the four corner posts 19 is provided with a roller 28 disposed in the raceway 27 to which the post 19 is adjacent.

I will now describe the mechanism whereby the pivoted end walls 16, 17 and 18 are caused to rise and fall and thereby reciprocate the roof 26 and slidable panels 14 and 15. Suitably journaled in the fixed rear end wall 13, there is the shaft 29 having the squared end 30, projecting outside of the wall 13, for application to the shaft 29 of an operating crank (not shown). The shaft 29 is provided with a sprocket wheel 32 connected by a sprocket chain 33 with a sprocket wheel 34 on a shaft 35 suitably journaled on a beam 2, and extended into a housing 36 depending from beams 2. Within the housing 36, the shaft 35 is provided with a worm 37 meshing with a worm gear 38 on a transverse shaft 39 passing through the housing 36 in journals 40 and suitably journaled in journals 41 in housings 42, respectively. The inner side of each housing 42 is bolted to a beam 1 and the outer side to a beam 6. On each end of the shaft 39, in the housings 42, respectively, is a pulley 43 having the grooves 44, 45, 46 and 47. Suitably journaled in each of the fixed side walls 10, adjacent the housings 42 are a pair of shafts 48 and 49 on which are mounted sprocket wheels 50, 51 and 52, 53, respectively. A sprocket chain 54, having its inner end fastened to the pulley 43, is rove about pulley 43 in the groove 44 counter-clockwise (Fig. 5), passed over sprocket wheel 50, and connected by turnbuckle 55 with cable 56 fastened in groove 23 of the pulley 22 disposed at the rear right corner of my device. A sprocket chain 57, having its inner end fastened to the pulley 43, is rove about pulley 43 in the groove 45 clockwise (Fig. 5), passed over sprocket wheel 51, and connected by turnbuckle 58 with cable 59 fastened in groove 24 of the pulley 22 to which the cable 56 is attached. The cables 56 and 59 are attached on opposite ends of a diameter of the pulley 22, and are wound about the pulley 22 clockwise and counterclockwise, respectively. A sprocket chain 60, having its inner end fastened to the pulley 43, is rove about the pulley 43 in the groove 46 counterclockwise (Fig. 5), passed over sprocket wheel 52 and connected by turnbuckle 61 with cable 62 fastened in groove 23 of the pulley 22 disposed at the front right corner of my device. A sprocket chain 63, having its inner end fastened to the pulley 43, is rove about pulley 43 in groove 47 clockwise (Fig. 5), and connected by turnbuckle 64 with cable 65 fastened in groove 24 of the pulley 22 to which cable 62 is attached. The cables 62 and 65 are attached on opposite ends of a diameter of the pulley 22 and wound about the pulley 22 counterclockwise and clockwise, respectively. The foregoing description covers the operating mechanism between the housing 42 and pulleys 22 on the right side of my device (Fig. 4). It is obvious that the mechanism is duplicated for operation of the pulleys 22 on the left side of the device.

My device is provided with two fixed rear end walls 12 and 13 and two corresponding hinged rear end walls 17 and 18, in order to provide for a door for ingress and egress when the device is in position for use. The walls 17 and 18 are connected at their tops by a transverse beam 66. A suitable door 67 is mounted by hinges 68 on the inboard edge of wall 18. I provide posts 19' hinged to the fixed end walls 12 and 13, respectively to which the inboard ends of the hinged walls 17 and 18, respectively, are attached. A door 69 is mounted by hinges 70 on the inboard edge of the fixed end wall 13, and a suitable bolt 71 is provided for connecting and disconnecting the doors 67 and 69. The hinged front end wall 16 is provided with a window 72.

Mounted at the front and rear ends and middle of the fixed side walls 10 are suitable racks 73, to receive the slidable panels 14 and 15. Each of these racks 73 comprises two guideways 74 and 75 for the panels 14 and 15, respectively. Each panel 14 is provided at its upper edge with outwardly downwardly turned flange 14', and each panel 15 is provided at its lower edge with inwardly upwardly turned flange 15'.

A suitable form of towing hitch 76 is provided at the forward end of my device.

From the foregoing description of the details of construction of my device, it is obvious that my device is demountable from the towing chassis, and can easily be taken apart and stored in a convenient space when not in use.

Figure 2:
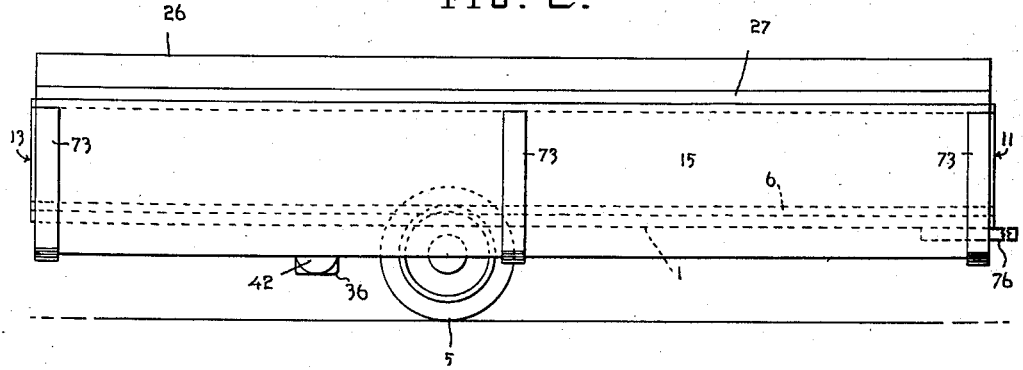
Fig. 2 is a side elevation of my device, the parts being shown collapsed for towing the device.

I will now describe the operation of my device. The parts are in the position shown in Fig. 2 when my device is to travel over the road, being towed by an automobile. When it is desired to adjust the device for use as a camp house, a suitable crank is applied to the square end 30 of shaft 29 and thereby the shaft 29 is rotated, causing shaft 35 to rotate through sprocket wheels 32 and 34 and chain 33, thereby causing rotation of shaft 39 through the worm 37 and worm gear 38, thereby rotating the pulleys 43 on ends of shaft 39, thereby winding chains 57 and 63 onto their pulleys 43, causing rotation of all four pulleys 22, thereby causing the pitmans 20 to raise posts 19 from their positions shown in dotted lines in Fig. 5 to their positions shown in full lines in Fig. 5. Through rollers 28 in the raceways 27, the posts 19 rising lift the top 26 from its position shown in Fig. 2 to its position shown in Fig. 1. The roof 26 carries aloft the upper side panels 15 attached to the roof 26 and which have been received in the guideways 75 of the racks 73. As the panels 15 rise from the guideways 75, their flanges 15' engage the flanges 14' and raise the panels 14 from the guideways 74 of the racks 73, thereby positioning the parts as shown in Fig. 4. The rising posts 19 erect the front and rear end walls of the device to positions shown in Figs. 3 and 4. It is obvious that the reverse rotation of shaft 29 will cause the parts to return to the position shown in Fig. 2.

When the parts have been erected, as above described, bolt 71 may be moved to connect doors 67 and 69, the bolt 71 being retracted to disconnect the doors 67 and 69 when the parts are to be collapsed. It is obvious that by the use of the turnbuckles 55, 58, 61 and 64 the proper tension may be maintained on the chains 54, 57, 60 and 63 and the cables 56, 59, 62 and 65, to assure positive action in raising and lowering posts 19 and their associated structures. It is also obvious that the sprocket wheels 50, 51, 52 and 53 and sprocket wheels 32 and 34, with their sprocket chains, with worm 37 and worm gear 38 insure positive actuation of the mechanism, and also serve to maintain it in its adjusted positions. It is obvious that any suitable protective means may be supplied to cover the end 30 of the shaft 29 to prevent unauthorized operation of the device, or a crank may be permanently attached to the shaft 29 with any suitable locking means therefor.

Having described my invention, what I claim is:

1. A camping house comprising a base, vertically slidable side walls and roof, pivoted end walls, and means adapted to slide the roof and side walls by moving the end walls about their pivots.

2. A camping house comprising a base, vertically slidable side walls and roof, pivoted end walls, means adapted to slide the roof and side walls by moving the end walls about their pivots, and means adapted to move said end walls about their pivots.

3. In a camping house, the combination of a base; a plurality of posts pivoted on said base; end walls on said posts; vertically slidable side walls and roof; and means adapted to slide the side walls and roof when the posts are moved about their pivots.

4. In a camping house, the combination of a base; a plurality of posts pivoted on said base; end walls on said posts; vertically slidable side walls and roof; means adapted to slide the side walls and roof when the posts are moved about their pivots; and means adapted to move said posts about their pivots.

5. In a camping house, the combination of a base; a plurality of posts pivoted on said base; end walls on said posts; reciprocable side walls and roof; means adapted to reciprocate the side walls and roof when the posts are moved about their pivots; a pitman pivoted to each post; a pulley journaled in said base on which each pitman is pivoted; and means for synchronously rotating said pulleys, thereby moving said posts about their pivots.

6. In a camping house, the combination of a base; a plurality of posts pivotally mounted on said base; a roller on the outer end of each post; two raceways in which said rollers are disposed; a roof from which said raceways depend; end walls mounted on said posts; and side walls of said house suspended from said roof.

7. In a camping house, the combination of a base; a plurality of posts pivotally mounted on said base; a roller on the outer end of each post; two raceways in which said rollers are disposed; a roof from which said raceways depend; end walls mounted on said posts; side walls of said house suspended from said roof; and means adapted to move said posts about their pivots.

8. In a camping house, the combination of a base; a plurality of posts pivotally mounted on said base; a roller on the outer end of each post; two raceways in which said rollers are disposed; a roof from which said raceways depend; end walls mounted on said posts; side walls suspended from said roof; a pitman pivoted to each post; a pulley journaled in said base on which each pitman is pivoted; and means for synchronously rotating said pulleys thereby moving said posts to cause the walls and roof to be raised and lowered.

9. In a camping house, the combination of a base; a shaft journaled in said base; means for rotating said shaft; two drums on said shaft; four pulleys journaled in said base; two cables attached to each pulley; four chains attached to each drum and connected with the cables respectively; a pitman pivoted on each pulley; four posts pivoted on said base, each pitman being pivoted to one of said posts; a front end wall attached to two of said posts; a rear end wall attached to the other of said posts; a roller journaled in the top of each post; two raceways, in each of which two of said rollers are disposed; a roof from which said raceways depend; and a plurality of sliding panels suspended from each side of said roof.

RALPH W. GORTON.